(12) United States Patent
Sung et al.

(10) Patent No.: US 9,793,725 B2
(45) Date of Patent: *Oct. 17, 2017

(54) BATTERY CELL BALANCING CIRCUIT USING LC SERIAL RESONANCE

(71) Applicant: POSTECH ACADEMY-INDUSTRY FOUNDATION, Pohang-si, Gyeongsangbuk-do (KR)

(72) Inventors: Chang Hyeon Sung, Daegu-si (KR); Kyung Min Lee, Daejeon-si (KR); Yoo Chae Chung, Pohang-si (KR); Bong Koo Kang, Pohang-si (KR)

(73) Assignee: POSTECH ACADEMY-INDUSTRY FOUNDATION, Pohang-si, Gyeongsangbuk-Do (KR)

( * ) Notice: Subject to any disclaimer, the term of this patent is extended or adjusted under 35 U.S.C. 154(b) by 164 days.

This patent is subject to a terminal disclaimer.

(21) Appl. No.: 14/760,037

(22) PCT Filed: Mar. 20, 2013

(86) PCT No.: PCT/KR2013/002290
§ 371 (c)(1),
(2) Date: Jul. 9, 2015

(87) PCT Pub. No.: WO2014/112685
PCT Pub. Date: Jul. 24, 2014

(65) Prior Publication Data
US 2015/0340886 A1 Nov. 26, 2015

(30) Foreign Application Priority Data
Jan. 18, 2013 (KR) .................. 10-2013-0005671

(51) Int. Cl.
*H02J 7/00* (2006.01)
*H01M 10/44* (2006.01)
*H01M 10/42* (2006.01)

(52) U.S. Cl.
CPC ......... *H02J 7/0016* (2013.01); *H01M 10/441* (2013.01); *H02J 7/0019* (2013.01);
(Continued)

(58) Field of Classification Search
CPC ..................................... H02J 7/0016
(Continued)

(56) References Cited

U.S. PATENT DOCUMENTS 5,656,915 A * 8/1997 Eaves ............... H01M 10/482
320/118
6,140,800 A * 10/2000 Peterson ............ H02J 7/0018
320/103
(Continued)

FOREIGN PATENT DOCUMENTS

| JP | 2012-34446 | 2/2012 |
| JP | 2013-13291 | 1/2013 |
| WO | 2010/079061 | 7/2010 |

OTHER PUBLICATIONS

International Search Report for International Application No. PCT/KR2013/002290, dated Sep. 25, 2013.
(Continued)

*Primary Examiner* — Samuel Berhanu
*Assistant Examiner* — Tessema Kebede
(74) *Attorney, Agent, or Firm* — Kile Park Reed & Houtteman PLLC

(57) ABSTRACT

The present invention relates to a technology capable of improving the use time of a battery cell by generally or individually controlling charge or discharge with respect to a multi-battery cell by using LC serial resonance in a module with a multi-battery cell structure. To this end, the present invention includes a battery module including a plurality of serially connected battery cells, a serial resonant circuit including serially connected inductor and capacitor and performing a serial resonant function, and first to third switch units that set an electric energy collection path and an electric energy supply path between the battery module and the serial resonant circuit.

20 Claims, 15 Drawing Sheets

(52) U.S. Cl.
CPC .......... *H02J 7/0021* (2013.01); *H02J 7/0022* (2013.01); *H01M 2010/4271* (2013.01)

(58) Field of Classification Search
USPC .......................................... 320/118
See application file for complete search history.

(56) References Cited

U.S. PATENT DOCUMENTS

| | | | |
|---|---|---|---|
| 2005/0029987 A1* | 2/2005 | Lin | H02J 7/0016 320/119 |
| 2010/0295509 A1 | 11/2010 | Moussaoui et al. | |
| 2011/0089898 A1* | 4/2011 | Lee | H02J 7/0016 320/116 |
| 2012/0007558 A1* | 1/2012 | Pigott | H02J 7/0018 320/118 |
| 2014/0139184 A1* | 5/2014 | De Vries | H02J 7/0016 320/116 |

OTHER PUBLICATIONS

Written Opinion for International Application No. PCT/KR2013/002290, dated Sep. 25, 2013.

* cited by examiner

BATTERY CELL BALANCING CIRCUIT USING LC SERIAL RESONANCE

TECHNICAL FIELD

The present disclosure relates to a balancing technology of a multi-battery cell, and particularly, to a battery cell balancing circuit using LC serial resonance, by which it is possible to improve the use time of a battery cell by generally or individually controlling charge or discharge with respect to a multi-battery cell by using LC serial resonance in a module with a multi-battery cell structure.

BACKGROUND ART

In general, when a voltage of both terminals of an electric cell (a battery cell) exceeds a predetermined value, there is a risk of explosion, and when the voltage drops below the predetermined value, eternal damage occurs in the battery cell. Since a hybrid electric vehicle, a notebook computer and the like require relatively large electric power, when electric power is supplied using the battery cell, a battery module (a battery pack) obtained by serially connecting battery cells is used. However, when such a battery module is used, voltage unbalance may occur by performance deviation of the battery cells.

At the time of charge of the battery module, when one battery cell firstly reaches an upper limit voltage as compared with other battery cells in the battery module, since it is not possible to charge the battery module any more, it is necessary to end the charge in the state in which the other battery cells have not been sufficiently charged. In such a case, the charge capacity of the battery module does not reach rated charge capacity.

At the time of discharge of the battery module, when one battery cell firstly reaches a lower limit voltage as compared with other battery cells in the battery module, since it is not possible to use the battery module any more, the use time of the battery module is shortened.

As described above, at the time of charge or discharge of the battery module, electric energy of a battery cell having higher electric energy is supplied to a battery cell having lower electric energy, so that it is possible to improve the use time of the battery module, wherein such an operation is called battery cell balancing.

FIG. 1 is a diagram illustrating a battery cell balancing circuit using a parallel resistor according to the conventional art. As illustrated in FIG. 1, the battery cell balancing circuit includes a battery module 11 having battery cells CELL1 to CELL4 serially connected to one another, resistors R11 to R14 serially connected to one another, and switches SW11 to SW15 that selectively connect both end terminals of the battery module 11 and respective connection terminals among the battery cells CELL1 to CELL4 to respective corresponding terminals of the resistors R11 to R14.

Referring to FIG. 1, at the time of charge of the battery module 11, when a charged voltage of an arbitrary battery cell of the battery cells CELL1 to CELL4 in the battery module 11 firstly reaches an upper limit voltage as compared with charged voltages of the other battery cells, a corresponding switch of the switches SW11 to SW15 is turned on, so that the charged voltage is discharged through a corresponding resistor of the resistors R11 to R14.

For example, when a charged voltage of the second battery cell CELL2 firstly reaches an upper limit voltage as compared with charged voltages of the other battery cells CELL1, CELL3, and CELL4, the switch SW12 is turned on. Accordingly, the charged voltage of the second battery cell CELL2 is discharged through the resistor R12, so that battery cell balancing is achieved.

However, in the case of using such a battery cell balancing circuit, since electric power is consumed through a resistor, efficiency is reduced. Furthermore, since it is not possible to supply an upper limit voltage to a battery cell having a low voltage during the use of a battery module, efficiency is reduced.

FIG. 2 is a diagram illustrating a battery cell balancing circuit using a capacitor according to the conventional art. As illustrated in FIG. 2, the battery cell balancing circuit includes a battery module 21 having battery cells CELL1 to CELL4 serially connected to one another, capacitors C21 to C23 serially connected to one another, and switches SW21 to SW24 that selectively connect one side terminal of the capacitor C21, a connection terminal between the capacitors C21 and C22, a connection terminal between the capacitors C22 and C23, and the other side terminal of the capacitor C23 to one of both terminals of each of the battery cells CELL1 to CELL4.

Referring to FIG. 2, the battery cell balancing circuit using a capacitor has two connection states. In the first connection state, the one side terminal of the capacitor C21, the connection terminal between the capacitors C21 and C22, the connection terminal between the capacitors C22 and C23, and the other side terminal of the capacitor C23 are respectively connected to one side terminal (a positive terminal) of each of the battery cells CELL1 to CELL4 as illustrated in FIG. 2. In the second connection state, the one side terminal of the capacitor C21, the connection terminal between the capacitors C21 and C22, the connection terminal between the capacitors C22 and C23, and the other side terminal of the capacitor C23 are respectively connected to the other side terminal (a negative terminal) of each of the battery cells CELL1 to CELL4.

However, such a battery cell balancing circuit has a problem that efficiency is low because a hard switching operation is generated between the capacitors and the battery cells. It is preferable that capacities of the battery cells in the battery module are equal to one another, but the capacities of the battery cells become different from one another due to various factors. In such a case, even though a charged voltage of a certain battery cell is lower than a charged voltage of another battery cell, it may have a larger capacity. In such a case, it is necessary to transfer a voltage of a battery cell having a high voltage to a battery cell having a low voltage. However, in such a conventional battery cell balancing circuit, it is not possible to perform such a voltage transfer function.

FIG. 3 is a diagram illustrating a battery cell balancing circuit using a fly-back structure according to the conventional art. As illustrated in FIG. 3, the battery cell balancing circuit includes a battery module 31 having battery cells CELL1 to CELL4 serially connected to one another, a fly-back converter 32, switches SW31 to SW34 that selectively connect a plurality of secondary coils of the fly-back converter 32 to both terminals of each of the battery cells CELL1 to CELL4, and a switch SW35 that selectively connects both ends of a primary coil of the fly-back converter 32 to both ends of the battery module 31.

The battery cell balancing circuit of FIG. 3 is a battery cell balancing circuit using a fly-back structure belonging to SMPS (Switch Mode Power Supply) and has a structure in which it is possible to transfer electric energy to the battery cells CELL1 to CELL4 serially connected to one another in the battery module 31 by using the switches SW31 to SW34, and it is possible to transfer electric energy between both end terminals of the battery module 31.

Since such a battery cell balancing circuit has a SMPS type, it has superior efficiency. However, as the number of battery cells included in the battery module increases, the size of a magnetic core used in the fly-back converter becomes large. Therefore, the cost of the battery cell balancing circuit becomes expensive.

DISCLOSURE

Technical Problem

Various embodiments are directed to minimize loss due to hard switching by enabling exchange of electric energy among battery cells by using an LC resonant circuit and to transfer energy from a battery cell having high energy to a battery cell having low energy.

Technical Solution

In an embodiment, a battery cell balancing circuit using LC serial resonance includes: a battery module including a plurality of serially connected battery cells; a serial resonant circuit including serially connected inductor and capacitor and performing a serial resonant function; a first switch unit including a plurality of switches each connected between each terminal of the plurality of battery cells and a first common node in order to provide a path for collecting electric energy charged in one or more battery cells of the plurality of battery cells and storing the electric energy in the capacitor, or for supplying the electric energy collected and stored in the capacitor to the one or more battery cells; a second switch unit including a plurality of switches each connected between each terminal of the plurality of battery cells and a second common node in order to provide the path for supplying the electric energy collected and stored in the capacitor to the one or more battery cells, or for collecting the electric energy charged in the one or more battery cells; and a third switch unit including a plurality of switches connected between the first common node and both terminals of the serial resonant circuit and switches connected between the second common node and both terminals of the serial resonant circuit in order to provide the path for collecting the electric energy charged in the one or more battery cells of the plurality of battery cells, or for supplying the electric energy collected and stored in the capacitor to the one or more battery cells.

In an embodiment, a battery cell balancing circuit using LC serial resonance includes: a battery module including a plurality of serially connected battery cells; a serial resonant circuit including serially connected inductor and capacitor and performing a serial resonant function; a first switch unit including a plurality of MOS transistors and reverse current blocking diodes connected between each terminal of the plurality of battery cells and a first common node in order to provide the path for collecting electric energy charged in one or more battery cells of the plurality of battery cells and storing the electric energy in the capacitor, or for supplying the electric energy collected and stored in the capacitor to the one or more battery cells, each MOS transistor and each diode being connected in parallel to each other; a second switch unit including a plurality of MOS transistors and reverse current blocking diodes connected between each terminal of the plurality of battery cells and a second common node in order to provide a path for supplying the electric energy collected and stored in the capacitor to the one or more battery cells, or for collecting the electric energy charged in the one or more battery cells, each MOS transistor and each diode being connected in parallel to each other; and a third switch unit including MOS transistors and reverse current blocking diodes connected between the first common node and both terminals of the serial resonant circuit and MOS transistors and reverse current blocking diodes connected between the second common node and both terminals of the serial resonant circuit in order to provide the path for collecting the electric energy charged in the one or more battery cells of the plurality of battery cells, or for supplying the electric energy collected and stored in the capacitor to the one or more battery cells, each MOS transistor and each diode being connected in parallel to each other.

In an embodiment, a battery cell balancing circuit using LC serial resonance includes: a battery module including a plurality of serially connected battery cells; a serial resonant circuit including serially connected inductor and capacitor and performing a serial resonant function; a first switch unit including a plurality of switch paths connected between some of terminals of the plurality of battery cells and a first common node in order to provide a path for collecting electric energy charged in an arbitrary cell of the plurality of battery cells, or for supplying the electric energy collected and stored in the capacitor to the arbitrary cell battery cell, the plurality of switch paths each including two serially connected MOS transistors each connected in parallel to diodes; a second switch unit including a plurality of switch paths connected between remaining terminals, other than some of terminals of the plurality of battery cells, and a second common node in order to provide the path for supplying the electric energy collected and stored in the capacitor to the arbitrary cell, or for collecting the electric energy charged in the arbitrary cell, the plurality of switch paths each including two serially connected MOS transistors each connected in parallel to diodes; and a third switch unit including switch paths connected between the first common node and both terminals of the serial resonant circuit and switch paths connected between the second common node and both terminals of the serial resonant circuit in order to provide the path for collecting the electric energy charged in the arbitrary cell of the plurality of battery cells, or for supplying the electric energy collected and stored in the capacitor to the arbitrary cell, the plurality of switch paths each including two serially connected MOS transistors each connected in parallel to diodes.

In an embodiment, a battery cell balancing circuit using LC serial resonance includes: a battery module including a plurality of serially connected battery cells; a serial resonant circuit including an inductor and a capacitor serially connected between a first common node and a second common node and performing a serial resonant function; a first switch unit including a plurality of switches each connected between each terminal of the plurality of battery cells and a first common node in order to provide a path for collecting electric energy charged in one or more battery cells of the plurality of battery cells and storing the electric energy in the capacitor, or for supplying the electric energy collected and stored in the capacitor to the one or more battery cells; and a second switch unit including a plurality of switches each connected between each terminal of the plurality of battery cells and a second common node in order to provide the path for supplying the electric energy collected and stored in the capacitor to the one or more battery cells, or for collecting the electric energy charged in the one or more battery cells.

Advantageous Effects

According to the present invention, in a circuit that performs a battery cell balancing function by using a plurality of battery cells provided therein, exchange of electric energy becomes possible among battery cells by using an LC resonant circuit, so that loss due to hard switching is minimized, and energy can be transferred from a battery cell having high energy to a battery cell having low energy, so that battery performance is improved.

MODE FOR INVENTION

Hereafter, various examples of embodiments of the present disclosure will be described in detail with reference to the accompanying drawings.

Figure 1:
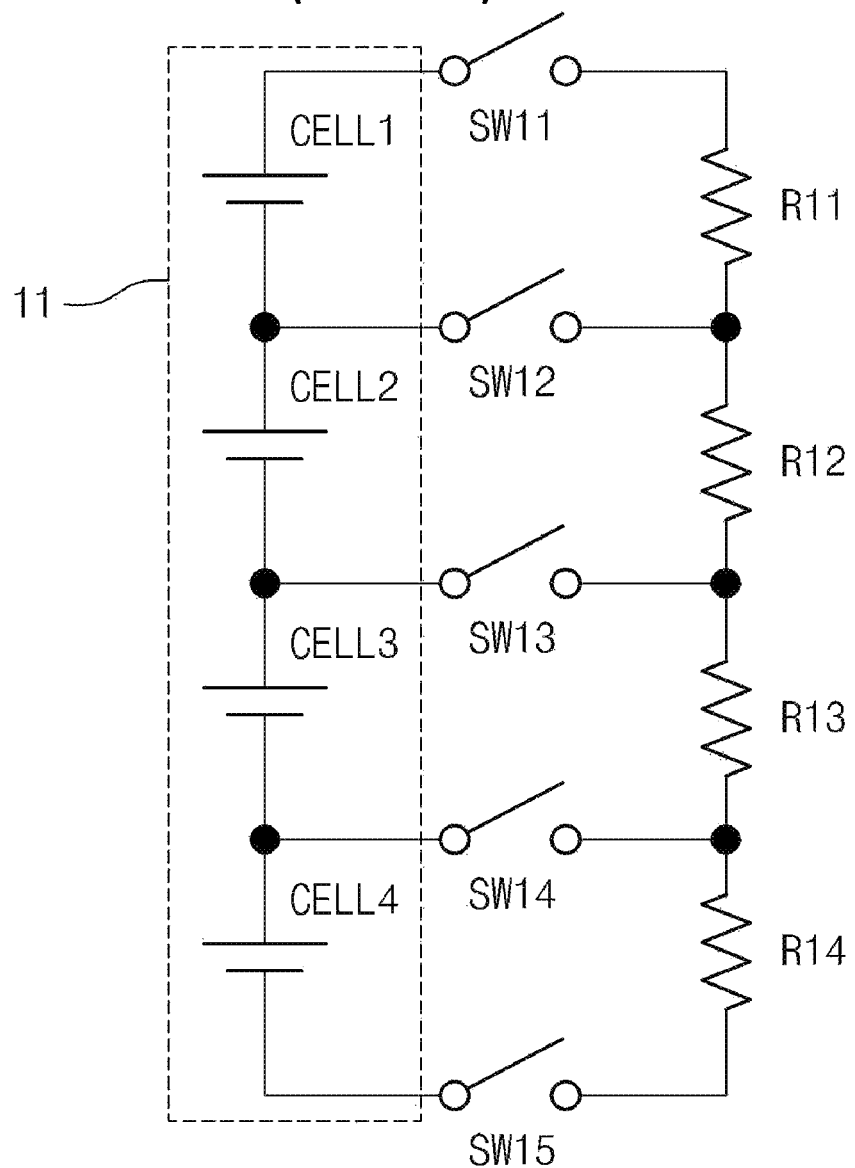
FIG. 1 is a diagram illustrating a battery cell balancing circuit using a parallel resistor according to the conventional art.
Figure 2:
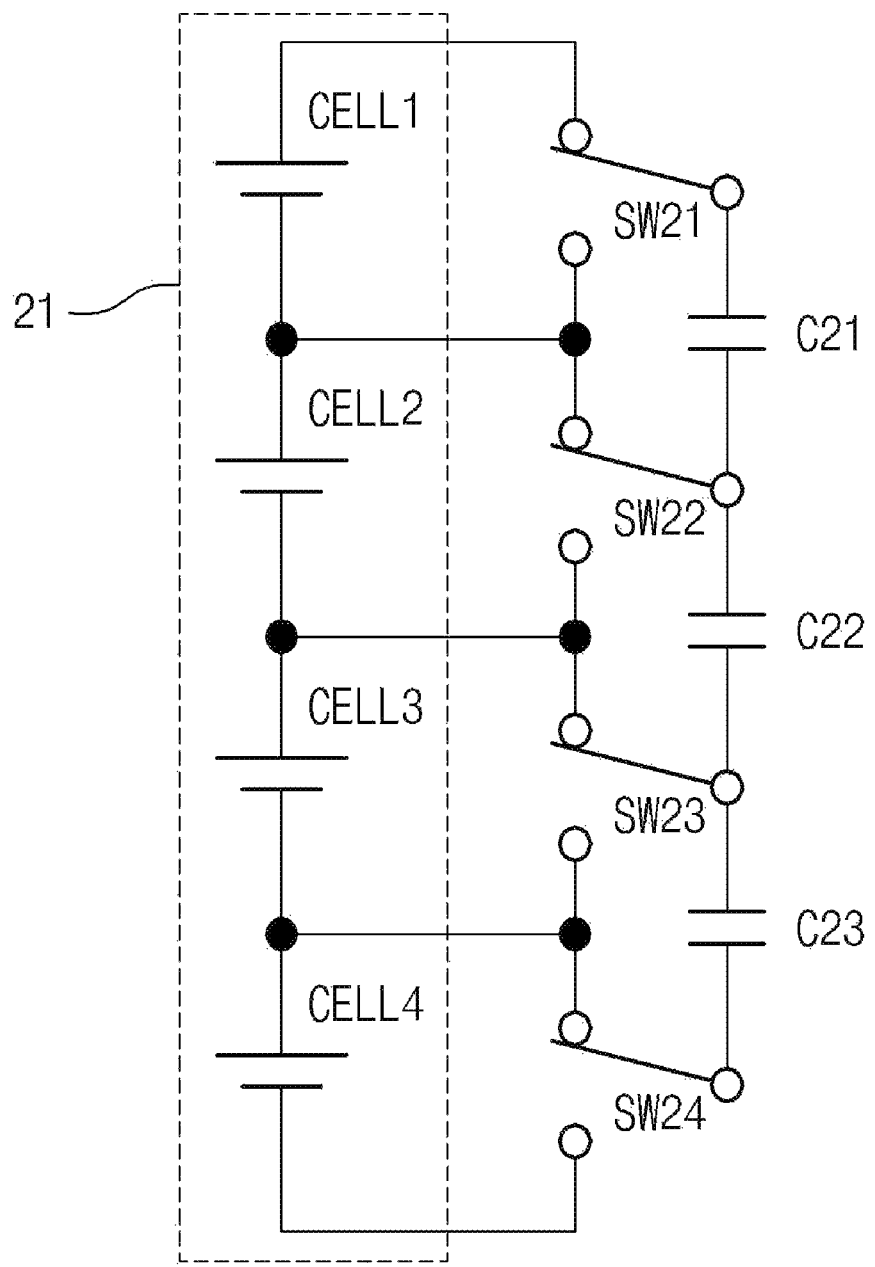
FIG. 2 is a diagram illustrating a battery cell balancing circuit using a capacitor according to the conventional art.
Figure 3:
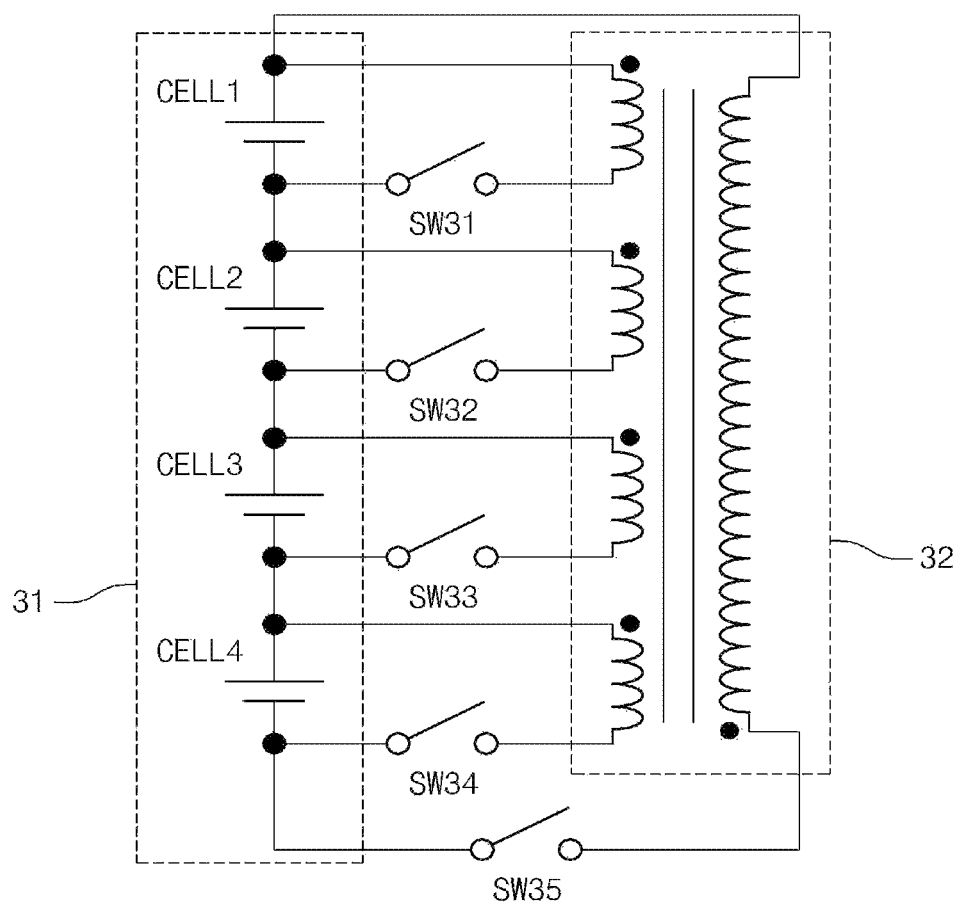
FIG. 3 is a circuit diagram illustrating a battery cell balancing circuit using a fly-back structure according to the conventional art.
Figure 4:
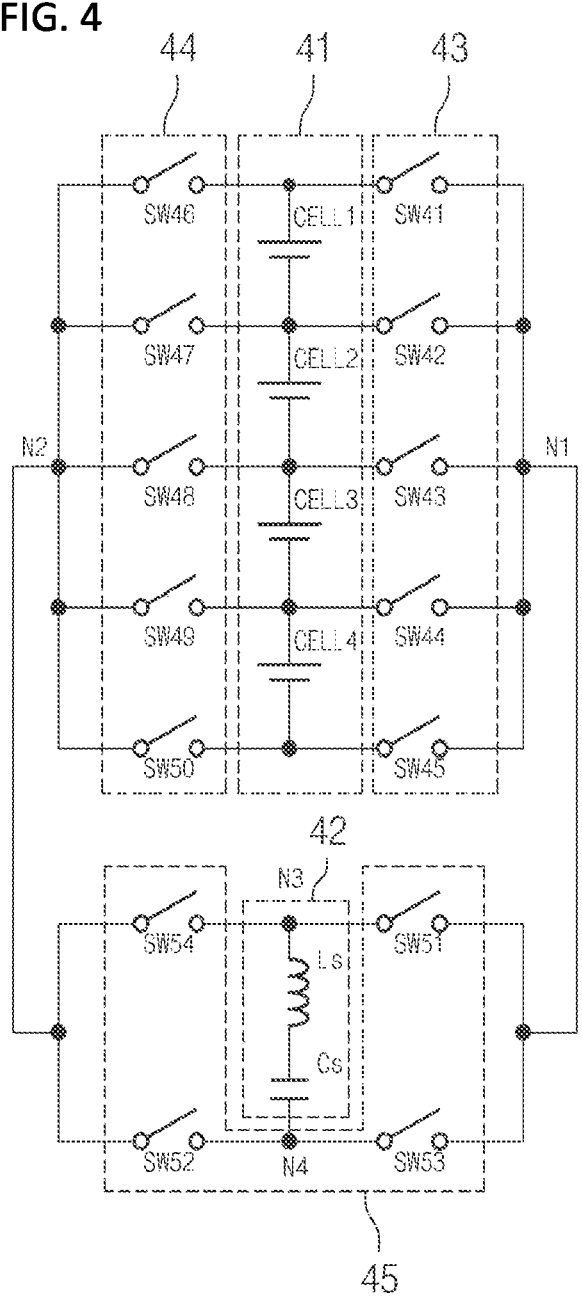
FIG. 4 is a diagram illustrating a battery cell balancing circuit using LC serial resonance according to a first embodiment of the present invention.

FIG. 4 is a circuit diagram illustrating a battery cell balancing circuit using LC serial resonance according to a first embodiment of the present invention, and includes a battery module 41, a serial resonant circuit 42, and first to third switch units 43 to 45.

The battery module 41 includes first to fourth battery cells CELL1 to CELL0 serially connected to one another.

The serial resonant circuit 42 includes an inductor Ls and a capacitor Cs serially connected to each other.

The first switch unit 43 is for forming collection and supply paths of electric energy, and includes first to fifth switches SW41 to SW45 each having one side terminal connected to respective terminals of the first to fourth battery cells CELL1 to CELL4 and the other side terminal commonly connected to a first common node N1.

The second switch unit 44 is for forming collection and supply paths of electric energy, and includes sixth to tenth switches SW46 to SW50 each having one side terminal connected to the respective terminals of the first to fourth battery cells CELL1 to CELL4 and the other side terminal commonly connected to a second common node N2.

The third switch unit 45 includes an eleventh switch SW51 that connects one end terminal of the serial resonant circuit 42 to the first common node N1 and a twelfth switch SW52 that connects the other end terminal of the serial resonant circuit 42 to the second common node N2 in an electric energy collection mode, and a thirteenth switch SW53 that connects the other end terminal of the serial resonant circuit 42 to the first common node N1 and a fourteenth switch SW54 that connects the one end terminal of the serial resonant circuit 42 to the second common node N2 in an electric energy supply mode.

The respective terminals of the first to fourth battery cells CELL1 to CELL4 indicate one side terminal of the first battery cell CELL1, a common connection terminal of the other side terminal of the first battery cell CELL1 and one side terminal of the second battery cell CELL2, a common connection terminal of the other side terminal of the second battery cell CELL2 and one side terminal of the third battery cell CELL3, a common connection terminal of the other side terminal of the third battery cell CELL3 and one side terminal of the fourth battery cell CELL4, and the other side terminal of the fourth battery cell CELL4.

Electric energy charged in an arbitrary battery cell of the first to fourth battery cells CELL1 to CELL4 of the battery module 41 is temporarily charged in the capacitor Cs of the serial resonant circuit 42 through the first switch unit 43 and the third switch unit 45, and the electric energy charged in the serial resonant circuit 42 is charged in an arbitrary battery cell of the first to fourth battery cells CELL1 to CELL4 through the third switch unit 45 and the second switch unit 44.

In FIG. 4, the SPST (Single Pole Single Throw) switch has been described as an example of the switches provided in the first to third switch units 43 to 45. However, the present invention is not limited thereto, and it may be implemented with another switch element, for example, a power switch of MOSFET (Metal Oxide Field Effect Transistor), BJT (Bipolar Junction Transistor), IGBT (Insulated Gate Bipolar Transistor) and the like.

When the number of battery cells of the battery module 41 is added, it is possible to add the number of switches of the first and second switch units 43 and 44 in correspondence to the added number.

Figure 5A:
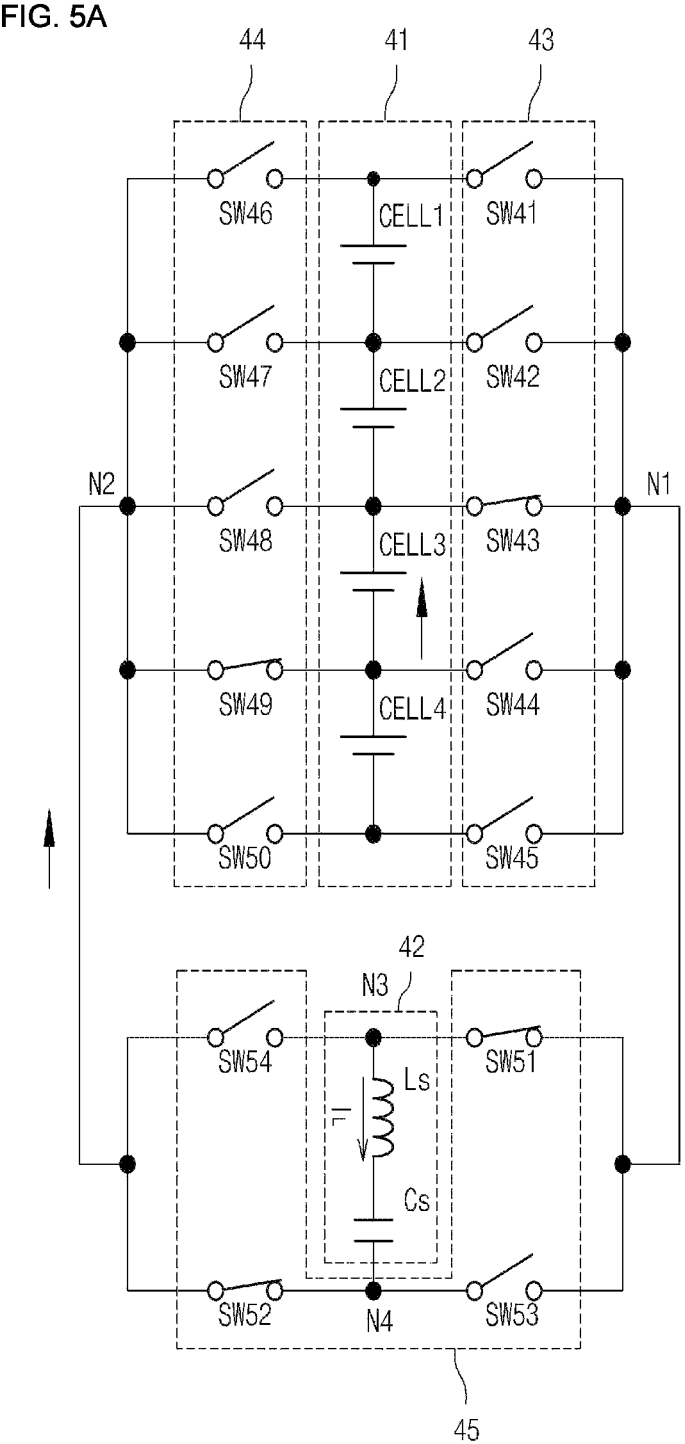
FIG. 5A is a circuit diagram illustrating an example in which electric energy of a battery cell is collected and stored in FIG. 4.

FIG. 5A illustrates an example in which electric energy relatively highly charged in the third battery cell CELL3 (an arbitrary battery cell of the first to fourth battery cells CELL1 to CELL4 of the battery module 41), as compared with other battery cells, is collected and is temporarily charged in the capacitor Cs of the serial resonant circuit 42.

Referring to FIG. 5A, among the first to fifth switches SW41 to SW45 of the first switch unit 43, the third switch SW43 is turned on and the other switches are maintained in a turned-off state. At this time, among the sixth to tenth switches SW46 to SW50 of the second switch unit 44, the ninth switch SW49 is turned on and the other switches are maintained in a turned-off state. Furthermore, among the eleventh to fourteenth switches SW51 to SW54 of the third switch unit 45, the eleventh and twelfth switches SW51 and SW52 are turned on and the other switches are maintained in a turned-off state. Accordingly, one side terminal of the third battery cell CELL3 of the battery module 41 is connected to a third common node N3 serving as one side terminal of the serial resonant circuit 42 through the third switch SW43 and the eleventh switch SW51, and a fourth common node N4 serving as the other side terminal of the serial resonant circuit 42 is connected to the second common node N2 through the twelfth switch SW52.

Figure 6A:
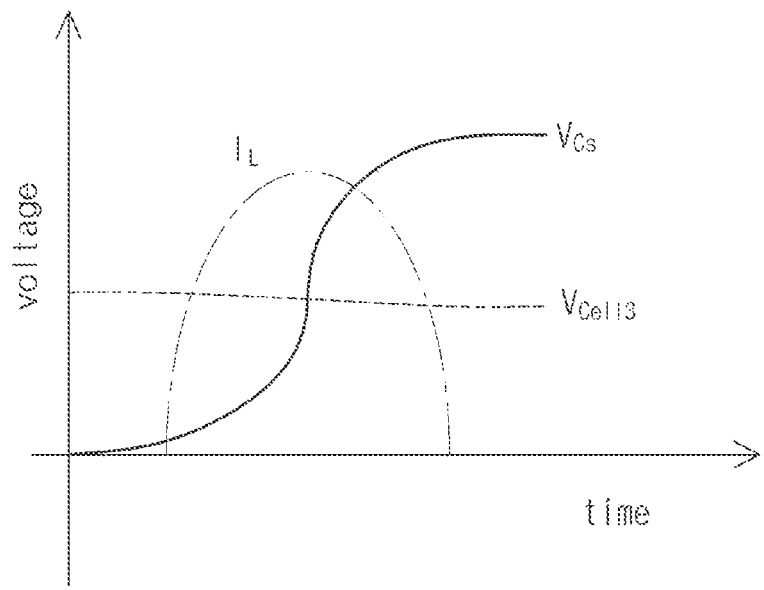
FIG. 6A is a waveform diagram illustrating a voltage charged in a capacitor of a resonant circuit and a current of a battery cell from which electric energy is collected.
Figure 6B:
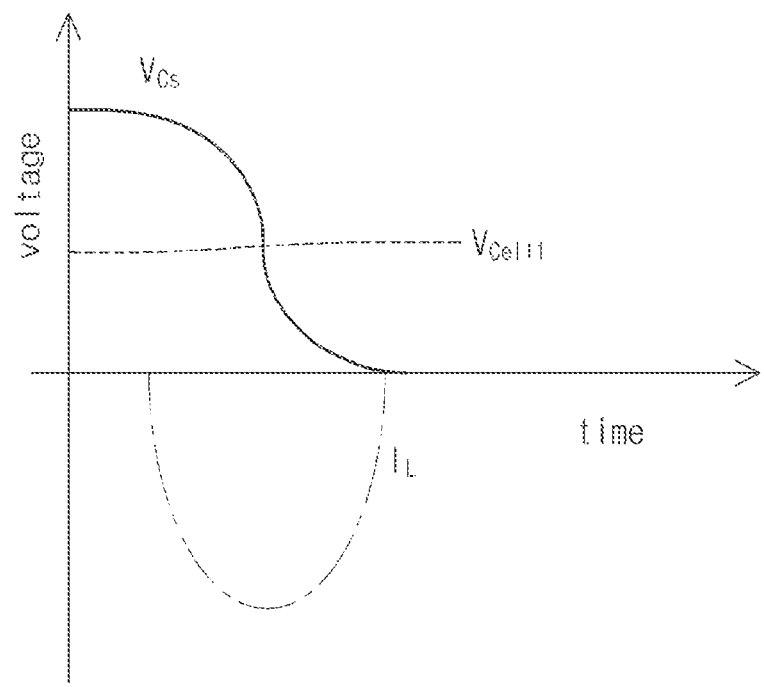
FIG. 6B is a waveform diagram illustrating a voltage discharged from a capacitor of a resonant circuit and a current of a battery cell to which electric energy is supplied.

Consequently, the charged energy of the third battery cell CELL3 is collected through the third and eleventh switches SW43 and SW51, and is charged in the capacitor Cs of the serial resonant circuit 42. Since the capacity of the third battery cell CELL3 is very larger than that of the capacitor Cs, when the serial resonant circuit 42 resonates, the charged voltage of the third battery cell CELL3 finely drops. At this time, the charged voltage of the capacitor Cs rises in the form of a sine function as illustrated in FIG. 6A. As described above, since the charged voltage of the capacitor Cs slowly rises, hard switching loss does not almost occur. In FIG. 6B, the current graph $I_L$ indicates a change in the current amount of the third battery cell CELL3.

Figure 5B:
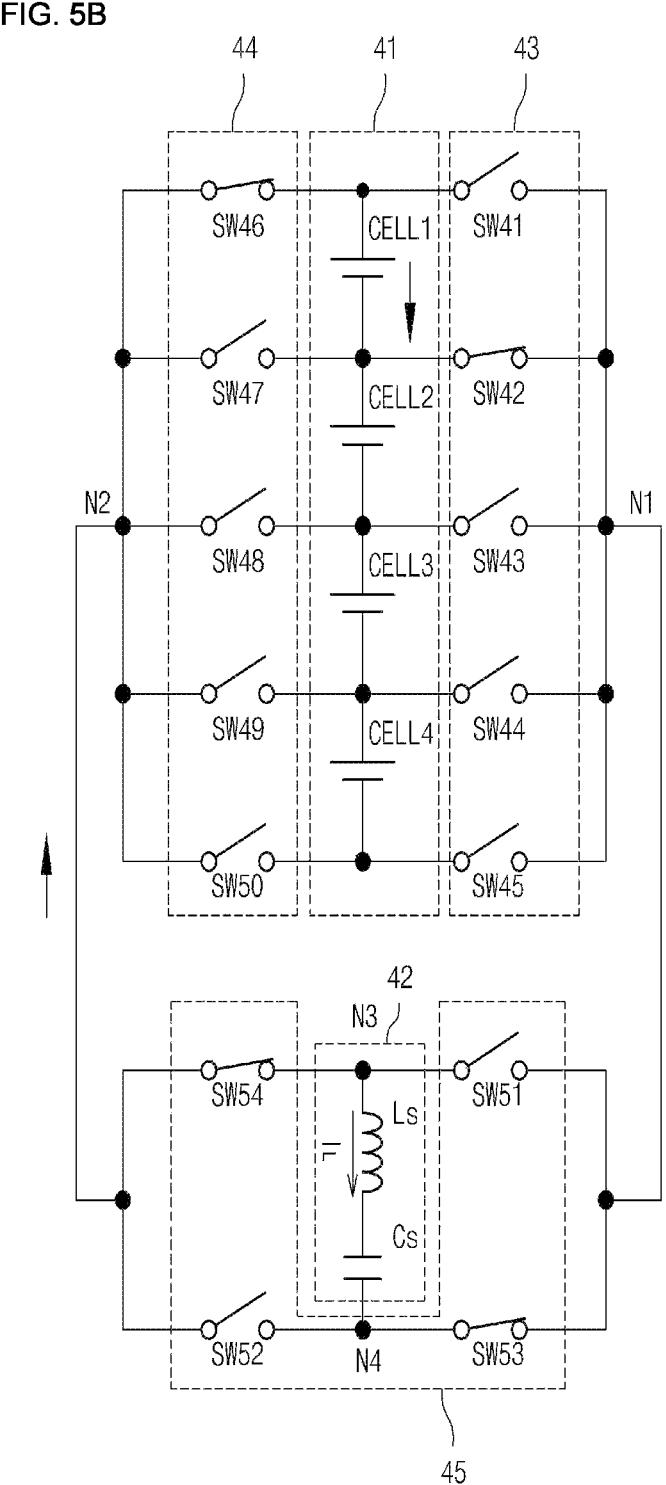
FIG. 5B is a circuit diagram illustrating an example in which electric energy collected and charged in FIG. 4 is supplied to a battery cell.

FIG. 5B illustrates an example in which the electric energy temporarily charged in the capacitor Cs of the serial resonant circuit 42 through the aforementioned process is supplied to the first battery cell CELL1 as an arbitrary battery cell of the first to fourth battery cells CELL1 to CELL4 of the battery module 41.

Referring to FIG. 5B, among the first to fifth switches SW41 to SW45 of the first switch unit 43, the second switch SW42 is turned on and the other switches are maintained in a turned-off state. At this time, among the sixth to tenth switches SW46 to SW50 of the second switch unit 44, the sixth switch SW46 is turned on and the other switches are maintained in a turned-off state. Furthermore, among the eleventh to fourteenth switches SW51 to SW54 of the third switch unit 45, the thirteenth and fourteenth switches SW53 and SW54 are turned on and the other switches are maintained in a turned-off state. Accordingly, the third common node N3 serving as the one side terminal of the serial resonant circuit 42 is connected to one side terminal of the first battery cell CELL1 of the battery module 41 through the fourteenth switch SW54 and the sixth switch SW46, and the fourth common node N4 serving as the other side terminal of the serial resonant circuit 42 is connected to the first common node N1 through the thirteenth switch SW53.

Consequently, the electric energy temporarily charged in the capacitor Cs of the serial resonant circuit 42 is supplied to the first battery cell CELL1 of the battery module 41 through the fourteenth and sixth switches SW54 and SW46. At this time, the charged voltage of the capacitor Cs falls in the form of a sine function as illustrated in FIG. 6B. In FIG. 6B, the current graph $I_L$ indicates a change in the current amount of the first battery cell CELL1.

As illustrated in FIG. 5A and FIG. 5B, an electric power amount when electric energy charged in an arbitrary battery cell is collected and is temporarily charged in the capacitor Cs of the serial resonant circuit 42 or the charged electric energy is supplied to an arbitrary battery cell is decided by values of the capacitor Cs and the inductor Ls of the serial resonant circuit 42. For example, since a transferred electric power amount is large as the value of the capacitor Cs is large and the value of the inductor Ls is small, balancing is quickly achieved. However, as the amount of a resonance current becomes large, since a loss amount also becomes large, it is preferable to appropriately set the values of the capacitor Cs and the inductor Ls.

For example, when the value of the inductor Ls is set to 500 μH and the value of the capacitor Cs is set to 120 μF, an electric power amount transferred through resonance has been checked to about 0.5 W through an experiment.

The operations of FIG. 5A and FIG. 5B are repeatedly performed as required until balancing is achieved between the third battery cell CELL3 and the first battery cell CELL1, so that the charged energy of the third battery cell CELL3 is collected and is supplied to the first battery cell CELL1.

To this end, among the first to fourth battery cells CELL1 to CELL4 of the battery module 41, a battery cell with the highest charged electric energy and a battery cell with the lowest charged electric energy can be selected, and a balancing algorithm for performing the aforementioned balancing function can be used.

So far, the case, in which the balancing function is performed for one battery cell with the highest charged electric energy and one battery cell with the lowest charged electric energy among the first to fourth battery cells CELL1 to CELL4 of the battery module 41, has been described. However, the present invention is not limited thereto, and it is possible to perform the balancing function for n battery cells through the aforementioned process.

For example, when the tenth switch SW50 and the first switch SW41 are allowed to be turned on and the eleventh and twelfth switches SW51 and SW52 are allowed to be turned on, electric energy charged in the first to fourth battery cells CELL1 to CELL4 of the battery module 41 can be collected to the capacitor Cs of the serial resonant circuit 42. Furthermore, when the sixth switch SW46 and the fifth switch SW45 are allowed to be turned on and the thirteenth and fourteenth switches SW53 and SW54 are allowed to be turned on, the electric energy temporarily charged in the capacitor Cs of the serial resonant circuit 42 can be supplied to the first to fourth battery cells CELL1 to CELL4 of the battery module 41.

Figure 7:
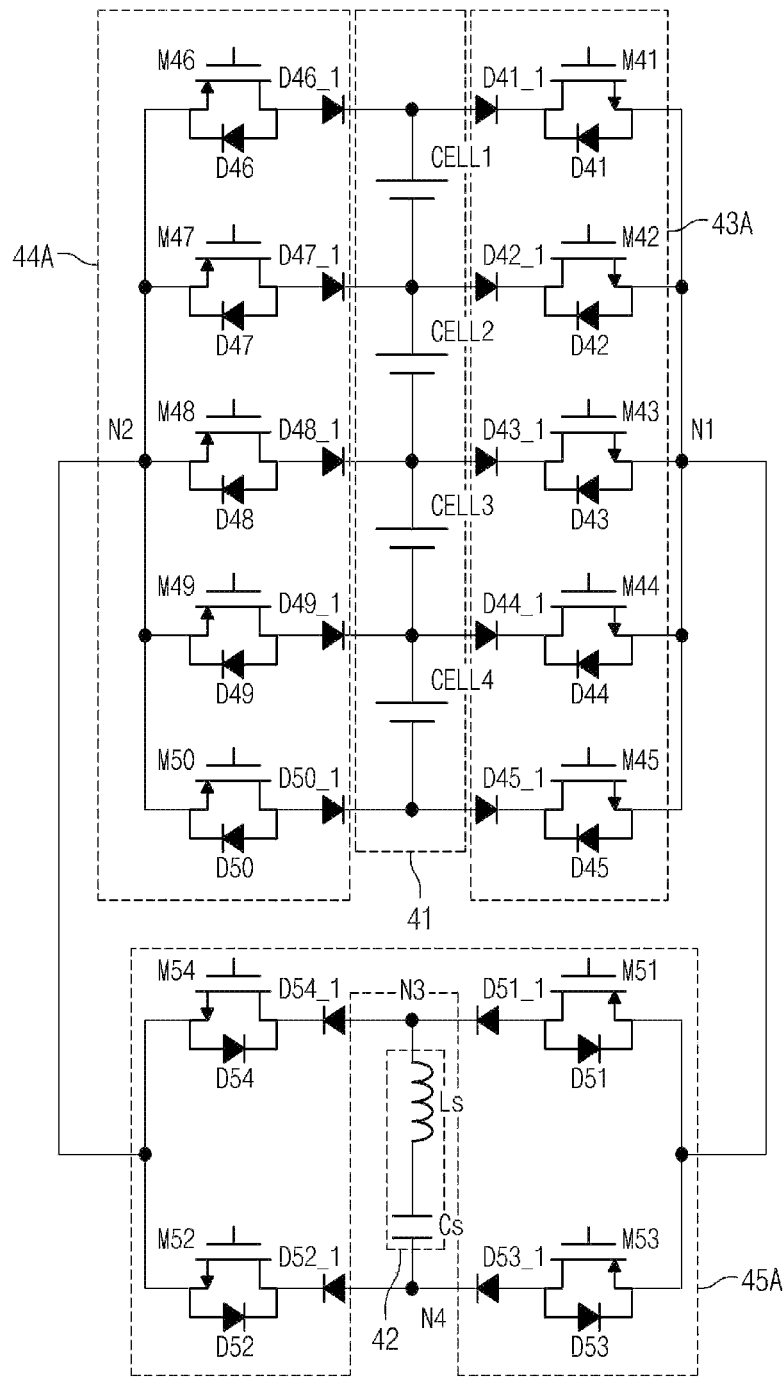
FIG. 7 is a circuit diagram illustrating a second embodiment in which switches of first to third switch units in FIG. 4 are implemented with N channel MOS transistors and diodes.

FIG. 7 illustrates a second embodiment for a battery cell balancing circuit of the present invention, and is different from the battery cell balancing circuit of the first embodiment of FIG. 4 in that switches of first to third switch units 43A, 44A, and 45A are implemented with first to fifth MOS transistors M41 to M45, sixth to tenth MOS transistors M46 to M50, and eleventh to fourteenth MOS transistors M51 to M54. FIG. 7 illustrates an example in which first to fourteenth reverse current blocking diodes D41_1 to D54_1 are serially connected between corresponding MOS transistors and corresponding nodes in order to prevent the first to fourth battery cells CELL1 to CELL4 of the battery module 41 from being damaged by a reverse current. An arrangement position of the MOS transistor and the diode serially connected to each other may be changed according to necessity, and the MOS transistor may include a P channel MOS transistor or an N channel MOS transistor. In addition, the first to fourteenth reverse current blocking diodes D41_1 to D54_1 are also connected between terminals of one side and terminals of the other side of first to fifth MOS transistors M41 to M45, the sixth to tenth MOS transistors M46 to M50, and the eleventh to fourteenth MOS transistors M51 to M54.

Figure 8:
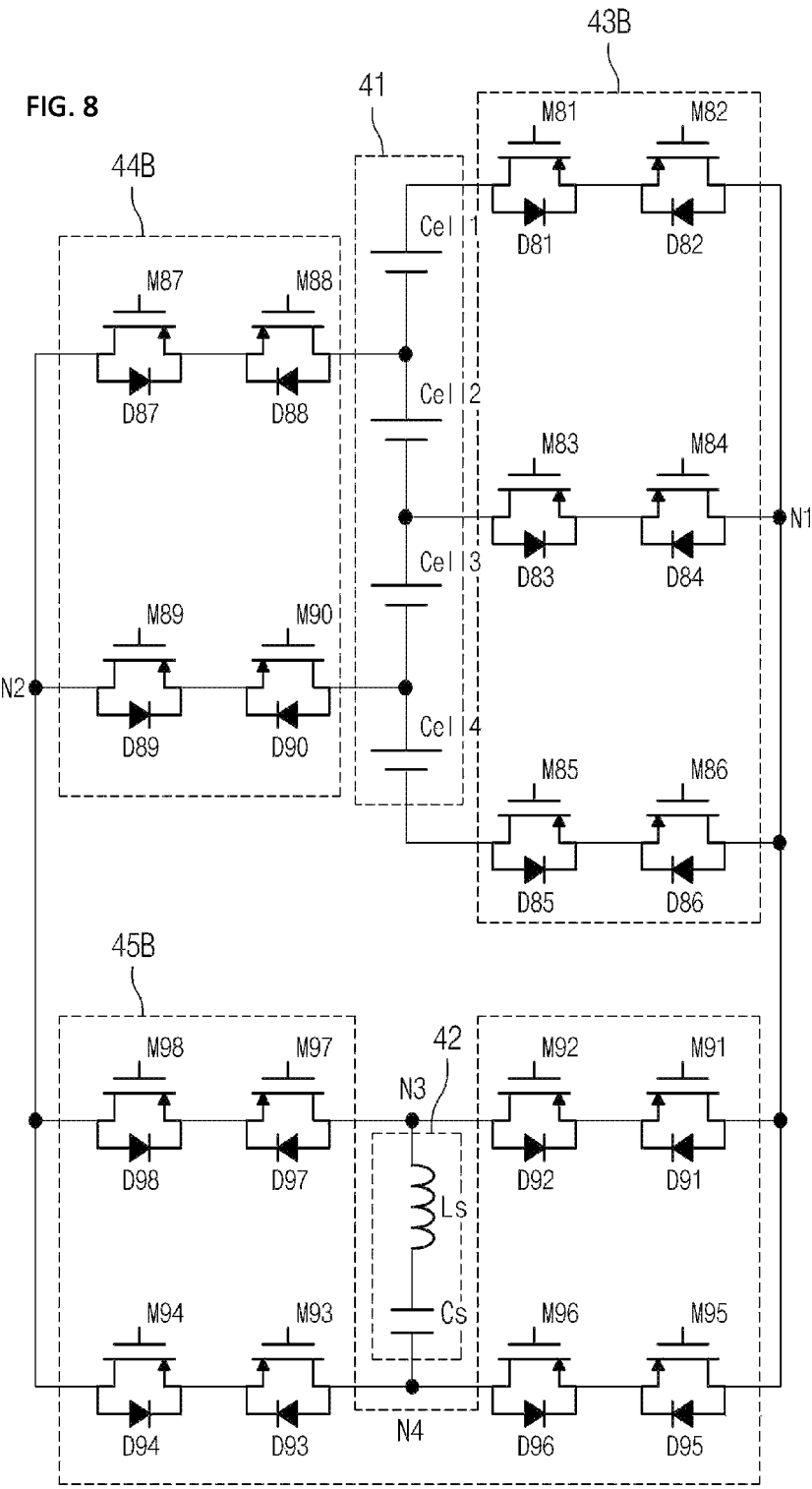
FIG. 8 is a circuit diagram illustrating a third embodiment in which switches of first to third switch units in FIG. 4 are simplified and implemented with N channel MOS transistors.

FIG. 8 illustrates a third embodiment for a battery cell balancing circuit of the present invention, and is different from that of FIG. 4 in that a current can be applied in two directions of first and second switch units 43B and 44B to reduce the number of switch paths to ½ and MOS transistors are used instead of the SPST switches.

That is, in the case of FIG. 4, since five switch paths respectively exist between the first to fourth battery cells CELL1 to CELL4 of the battery module 41 and the first and second common nodes N1 and N2, the total 10 switch paths exist. Meanwhile, in the case of FIG. 8, since three switch paths exist in the first switch unit 43B connected between the first to fourth battery cells CELL1 to CELL4 of the battery module 41 and the first common node N1 and two switch paths exist in the second switch unit 44B connected between the first to fourth battery cells CELL1 to CELL4 of the battery module 41 and the second common node N2, the total five switch paths exist.

In such a case, in order to allow a current to be applied in two directions in each of the five switch paths, a pair of a MOS transistor and a diode connected in parallel to each other are serially connected to another pair of a MOS transistor and a diode connected in parallel to each other, and these two pairs are provided on each of the five switch paths. For example, in the first switch unit 43B, first and second MOS transistors M81 and M82 each connected in parallel to diodes are serially connected between one side terminal of the first battery cell CELL1 and the first common node N1, third and fourth MOS transistors M83 and M84 each connected in parallel to diodes are serially connected between one side terminal of the third battery cell CELL3 and the first common node N1, and fifth and sixth MOS transistors M85 and M86 each connected in parallel to diodes are serially connected between one side terminal of the fourth battery cell CELL4 and the first common node N1. Similarly, in the second switch unit 44B, seventh and eighth MOS transistors M87 and M88 each connected in parallel to diodes are serially connected between one side terminal of the second battery cell CELL2 and the second common node N2, and ninth and tenth MOS transistors M89 and M90 each connected in parallel to diodes are serially connected between one side terminal of the fourth battery cell CELL4 and the second common node N2.

In addition, also in a third switch unit 45B, MOS transistors are connected as described above. That is, eleventh and twelfth MOS transistors M91 and M92 each connected in parallel to diodes are serially connected between the first common node N1 and the third common node N3 serving as one side terminal of the serial resonant circuit 42, thirteenth and fourteenth MOS transistors M93 and M94 each connected in parallel to diodes are serially connected between the second common node N2 and the fourth common node N4 serving as the other side terminal of the serial resonant circuit 42, fifteenth and sixteenth MOS transistors M95 and M96 each connected in parallel to diodes are serially connected between the first common node N1 and the fourth common node N4, and seventeenth and eighteenth MOS transistors M97 and M98 each connected in parallel to diodes are serially connected between the second common node N2 and the third common node N3.

For example, an electric energy collection path of the third battery cell CELL3 is formed by the one side terminal of the third battery cell CELL3, a third diode D83, the third MOS transistor M84, the first common node N1, an eleventh diode D91, the twelfth MOS transistor M92, the serial resonant circuit 42, a thirteenth diode D93, the fourteenth MOS transistor M94, the second common node N2, a ninth diode D89, the tenth MOS transistor M90, and the other side terminal of the third battery cell CELL3.

In another example, a path for supplying the electric energy collected and stored in the capacitor Cs to the fourth battery cell CELL4 is formed by the other side terminal of the fourth battery cell CELL4, a fifth diode D85, the sixth MOS transistor M86, the first common node N1, a fifteenth diode D95, the sixteenth MOS transistor and M96, the serial resonant circuit 42, a seventeenth diode D97, the eighteenth MOS transistor M98, the second common node N2, the ninth diode D89, the tenth MOS transistor M90, and the one side terminal of the fourth battery cell CELL4.

Figure 9:
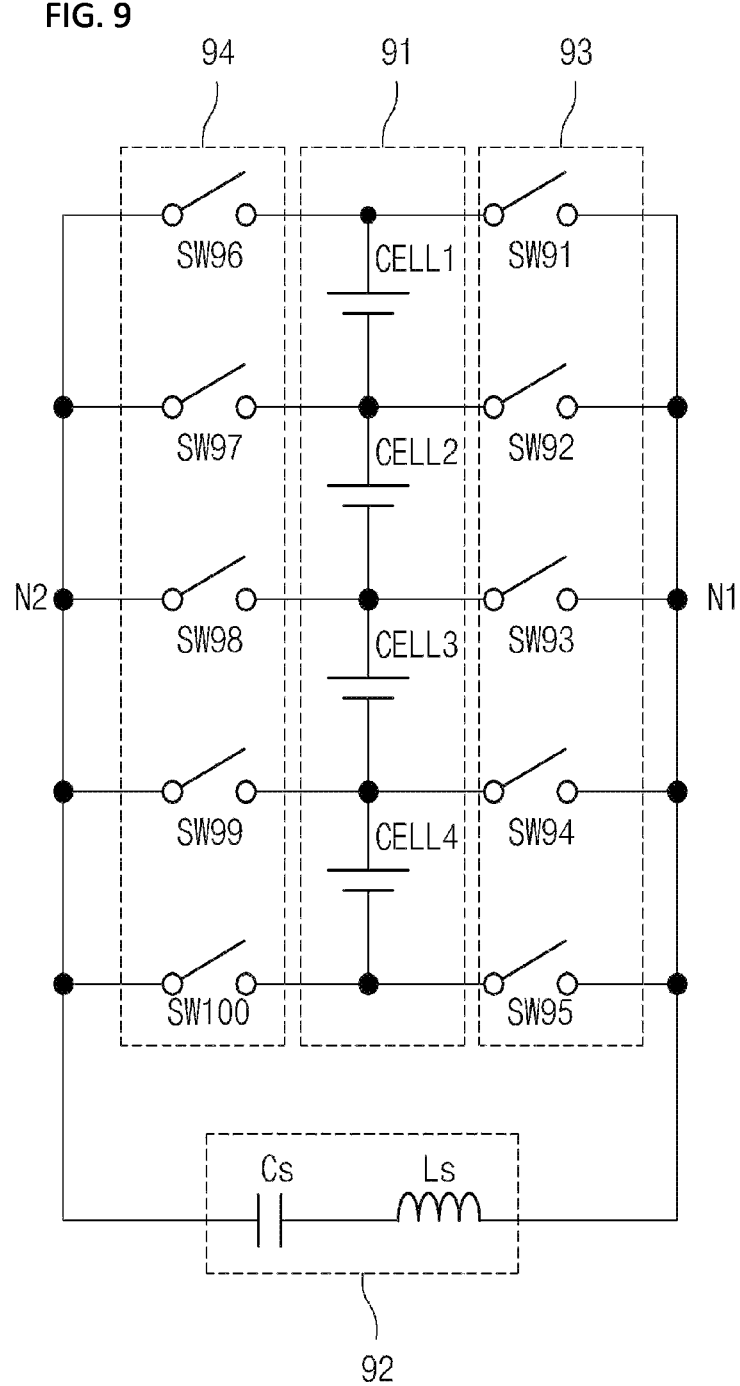
FIG. 9 is a circuit diagram illustrating a battery cell balancing circuit using LC serial resonance according to a fourth embodiment of the present invention.

FIG. 9 illustrates a fourth embodiment for a battery cell balancing circuit of the present invention, and is different from the battery cell balancing circuit of the first embodiment of FIG. 4 in that the third switch unit is omitted.

Referring to FIG. 9, the battery cell balancing circuit includes a battery module 91, a serial resonant circuit 92, a first switch unit 93, and a second first switch unit 94. Differently from FIG. 4, the serial resonant circuit 92 is not selectively connected between the first and second common nodes N1 and N2 through a switch element, and one side terminal of an inductor Ls of the serial resonant circuit 92 is fixedly connected to the first common node N1 and the other side terminal of a capacitor Cs of the serial resonant circuit 92 is fixedly connected to the second common node N2.

Figure 10A:
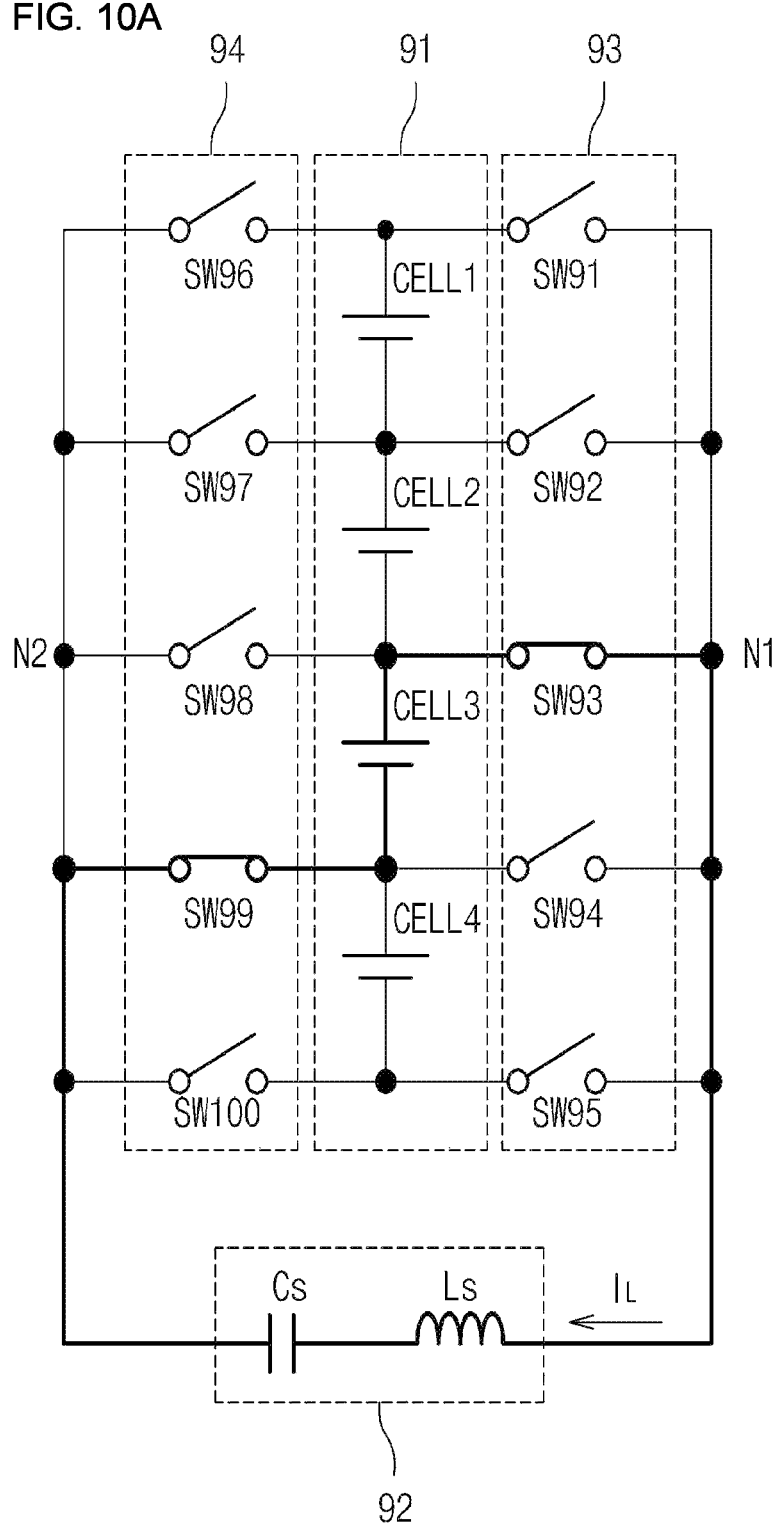
FIG. 10A is a circuit diagram illustrating an example in which electric energy collected and charged in FIG. 9 is supplied to a battery cell.

FIG. 10A is an exemplary diagram of charge and illustrates an example in which electric energy charged in the third battery cell CELL3 in FIG. 9 is collected and is temporarily charged in the capacitor Cs of the serial resonant circuit 92.

In such a case, a third switch SW93 and a ninth switch SW99 are turned on and the other switches are maintained in a turned-off state. Accordingly, a collection path connected to one side terminal of the third battery cell CELL3, the third switch SW93, the first common node N1, the serially connected inductor Ls and capacitor Cs of the serial resonant circuit 92, the second common node N2, the ninth switch SW99, and the other side terminal of the third battery cell CELL3 is formed. Consequently, the electric energy of the third battery cell CELL3 is temporarily charged in the capacitor Cs through the third switch SW93, the first common node N1, and the inductor Ls.

Figure 10B:
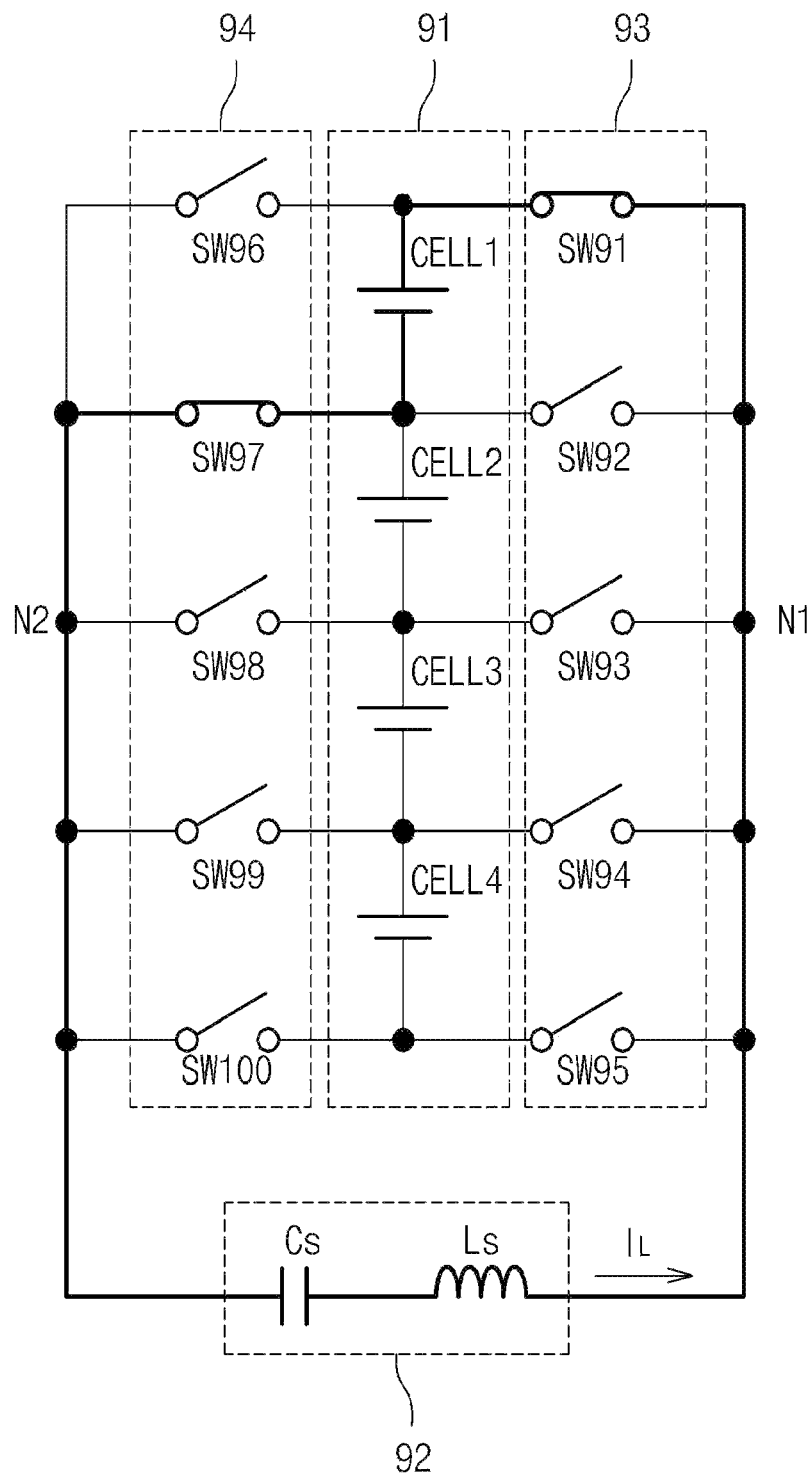
FIG. 10B is a circuit diagram illustrating an example in which electric energy collected and charged in FIG. 9 is supplied to a battery cell.

FIG. 10B is an exemplary diagram of supply of charged electric energy and illustrates an example in which the electric energy temporarily charged in the capacitor Cs is charged in the first battery cell CELL1.

In such a case, a first switch SW91 and a seventh switch SW97 are turned on and the other switches are maintained in a turned-off state. Accordingly, a supply path connected to one side terminal of the first battery cell CELL1, the first switch SW91, the first common node N1, the serially connected inductor Ls and capacitor Cs of the serial resonant circuit 92, the second common node N2, the seventh switch SW97, and the other side terminal of the first battery cell CELL1 is formed. Consequently, the electric energy charged in the capacitor Cs is supplied to and charged in the first battery cell CELL1 through the inductor Ls, the first common node N1, and the first switch SW91.

Figure 11:
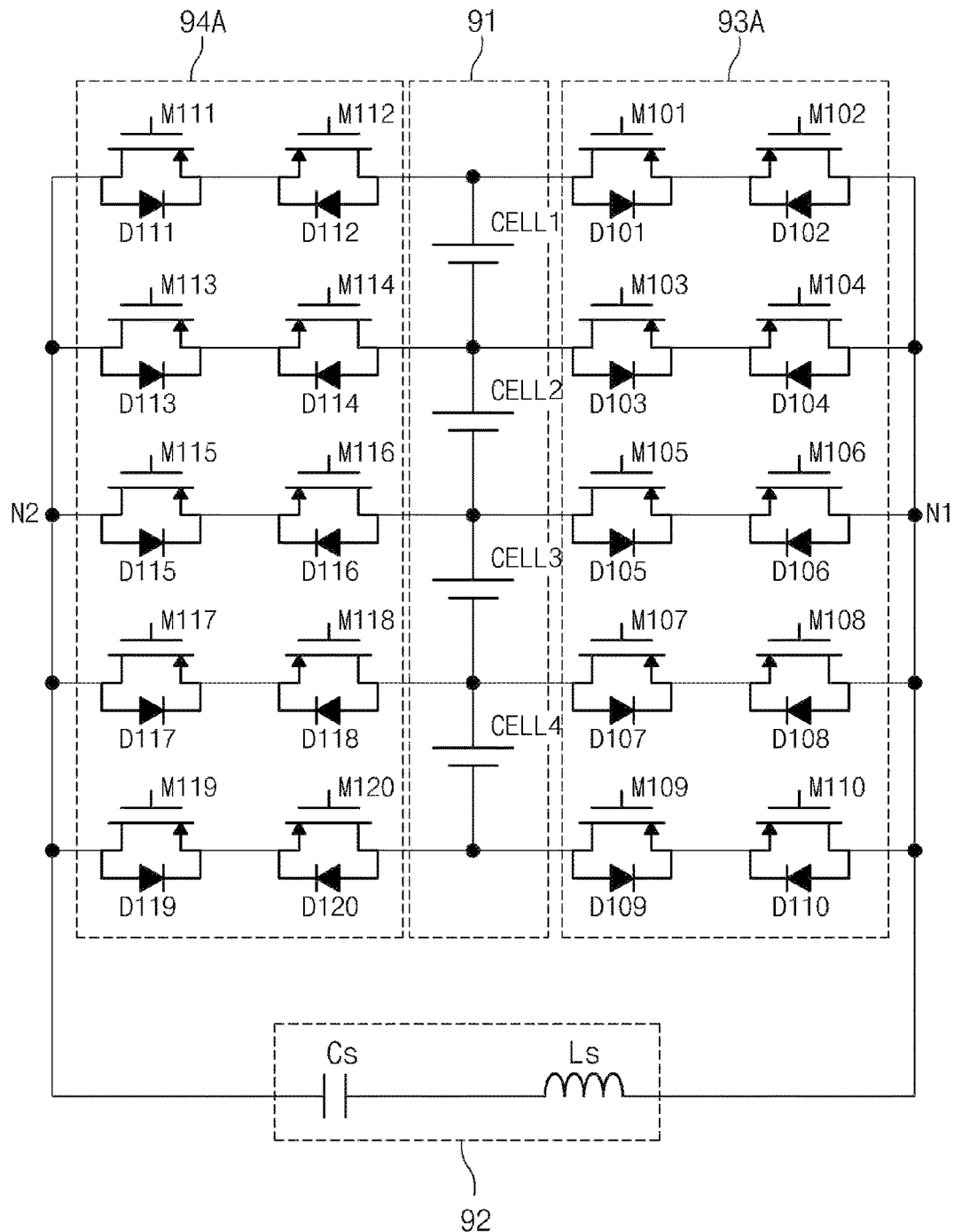
FIG. 11 is a circuit diagram illustrating an example in which first and second switch units in FIG. 9 are implemented with N channel MOS transistors.

FIG. 11 is a diagram illustrating an example in which the SPST switches of the first and second switch units 93 and in the battery cell balancing circuit of FIG. 9 are implemented with MOS transistors.

Referring to FIG. 11, in a first switch unit 93A, first and second MOS transistors M101 and M102 each connected in parallel to diodes are serially connected between one side terminal of the first battery cell CELL1 and the first common node N1, third and fourth MOS transistors M103 and M104 each connected in parallel to diodes are serially connected between one side terminal of the second battery cell CELL2 and the first common node N1, fifth and sixth MOS transistors M105 and M106 each connected in parallel to diodes are serially connected between one side terminal of the third battery cell CELL3 and the first common node N1, seventh and eighth MOS transistors M107 and M108 each connected in parallel to diodes are serially connected between one side terminal of the fourth battery cell CELL4 and the first common node N1, and ninth and tenth MOS transistors M109 and M110 each connected in parallel to diodes are serially connected between the other side terminal of the fourth battery cell CELL4 and the first common node N1.

In a second switch unit 94A, eleventh and twelfth MOS transistors M111 and M112 each connected in parallel to diodes are serially connected between the other side terminal of the first battery cell CELL1 and the second common node N2, thirteenth and fourteenth MOS transistors M113 and M114 each connected in parallel to diodes are serially connected between the other side terminal of the second battery cell CELL2 and the second common node N2, fifteenth and sixteenth MOS transistors M115 and M116 each connected in parallel to diodes are serially connected between the other side terminal of the third battery cell CELL3 and the second common node N2, seventeenth and eighteenth MOS transistors M117 and M118 each connected in parallel to diodes are serially connected between the other side terminal of the fourth battery cell CELL4 and the second common node N2, and nineteenth and twentieth MOS transistors M119 and M120 each connected in parallel to diodes are serially connected between the other side terminal of the fourth battery cell CELL4 and the second common node N2.

Figure 12:
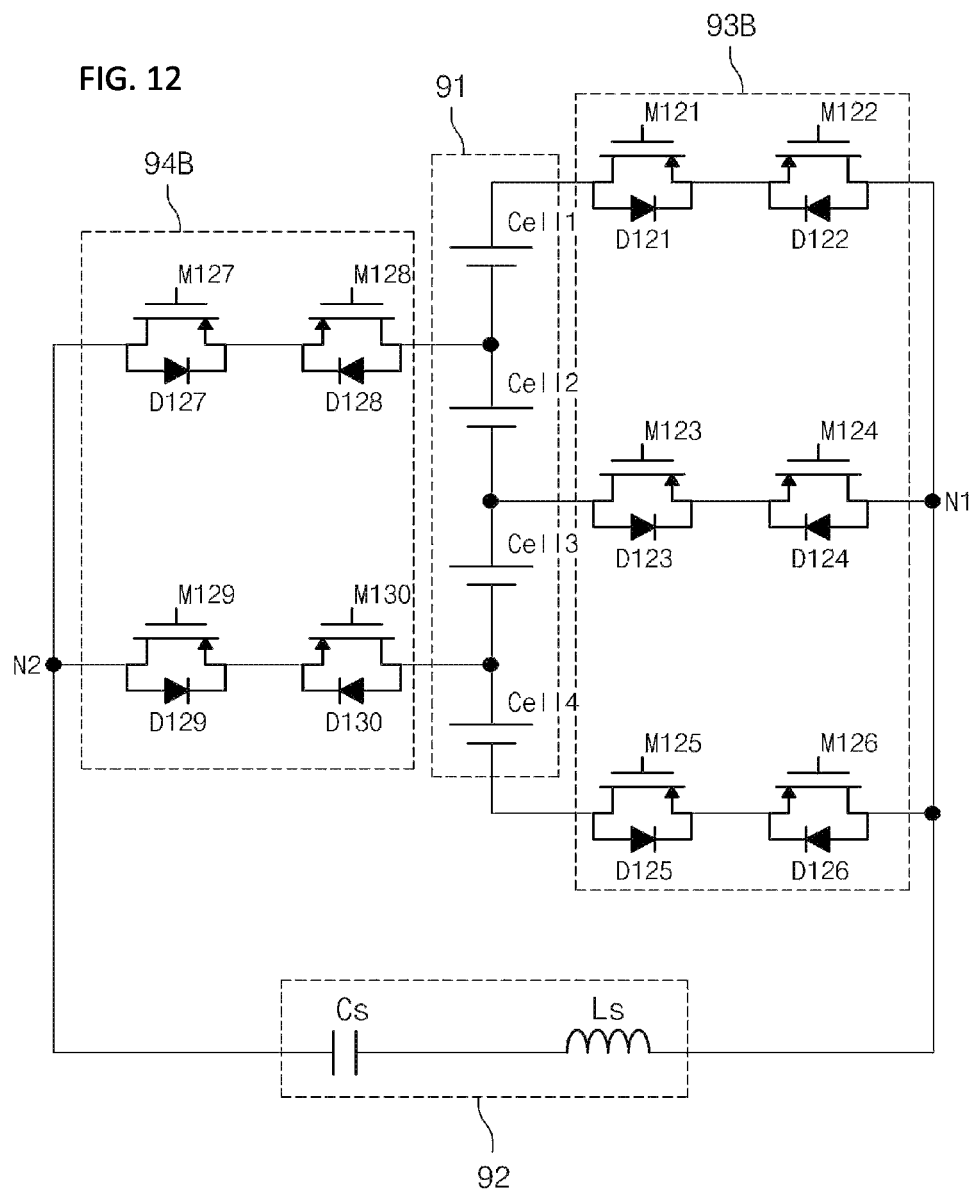
FIG. 12 is a circuit diagram illustrating an example in which first and second switch units in FIG. 9 are simplified and implemented with N channel MOS transistors.

FIG. 12 illustrates another embodiment of the first and second switch units of FIG. 9, and is different from that of FIG. 9 in that a current can be applied in two directions of first and second switch units 93B and 94B to reduce the number of switch paths to ½ and MOS transistors are used instead of the SPST switches. The configurations of the first and second switch units 93B and 94B are equal to those of the first and second switch units 43B and 44B in FIG. 8. However, FIG. 12 is different from FIG. 8 in that the third switch unit is omitted and both end terminals of the serial resonant circuit 92 are directly connected between the first and second common nodes N1 and N2.

By such a structure, there is a limitation in a current flow among the first to fourth battery cells CELL1 to CELL4. That is, electric energy can be transferred only between the first and third cells CELL1 and CELL3 which are battery cells in an odd sequence, or can be transferred only between the second and fourth cells CELL2 and CELL4 which are battery cells in an even sequence.

Figure 13:
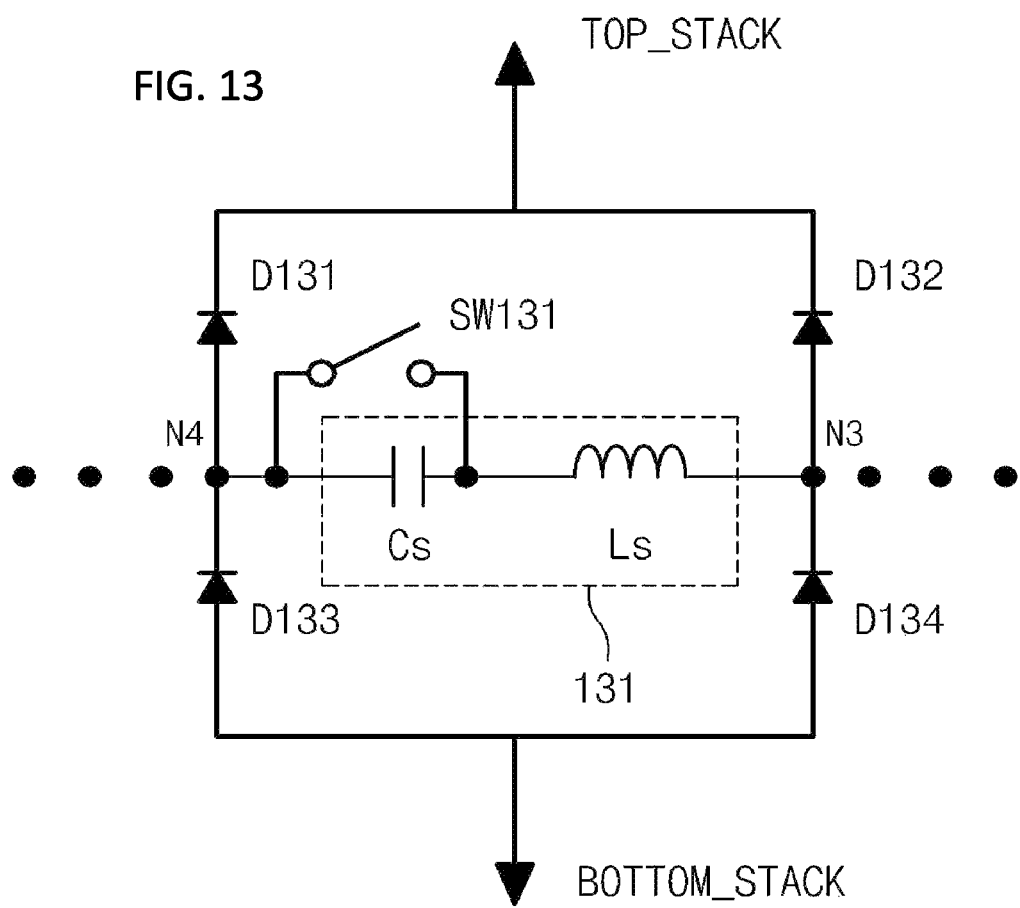
FIG. 13 is a diagram for protecting a serial resonant circuit and switch units in FIG. 9.

FIG. 13 illustrates an embodiment of a circuit for protecting the serial resonant circuit applied to the battery cell balancing circuit of the present invention.

Referring to FIG. 13, the protection circuit for the serial resonant circuit according to the present invention includes first and second diodes D131 and D132 connected in parallel to each other between both end terminals of a serial resonant circuit 131 including serially connected inductor Ls and capacitor Cs and an upper terminal TOP_STACK, third and fourth diodes D133 and D134 connected in parallel to each other between both end terminals of the serial resonant circuit 131 and a lower terminal BOTTOM_STACK, and a switch SW131 connected in parallel to the capacitor Cs.

The upper terminal TOP_STACK is connected to a positive terminal of the uppermost first battery cell CELL1 in the battery module 91 of FIG. 12, and the lower terminal BOTTOM_STACK is connected to a negative terminal of the lowermost fourth battery cell CELL4 in the battery module 91.

When a current path is cut in the state in which a current is flowing through the inductor Ls, a strong voltage spike phenomenon occurs at both ends of the inductor Ls. For example, in the state in which a current is flowing from the third common node N3 to the fourth common node N4, at the moment at which the current is blocked, a very high voltage with a positive polarity (+) is applied to the fourth common node N4 and a very low voltage with a negative polarity (−) is applied to the third common node N3. Therefore, there is a risk that the switch elements connected to the serial resonant circuit 131 may be broken.

However, the switch elements are protected by the diodes D131 to D134 connected as illustrated in FIG. 13. For example, a current flows toward a battery stack through a path of the diode D134, the inductor Ls, the capacitor Cs, and the diode D131, so that only a voltage corresponding to the battery stack is applied to both ends of the fourth common node N4 and the third common node N3. By such a principle, the elements are protected.

The protection circuit protects the switching elements and the serial resonant circuit 131 from voltage spike which may occur due to a rapid change in the inductor current when a current remaining in the inductor Ls is exhausted after a resonance operation of the serial resonant circuit 131. Furthermore, the switch SW131 resets charge remaining in the capacitor Cs after the resonance operation of the serial resonant circuit 131, thereby allowing next resonance to be efficiently performed.

Although a preferred embodiment of the present invention has been described for illustrative purposes, those skilled in the art will appreciate that various modifications, additions and substitutions are possible, without departing from the scope and the spirit of the invention as disclosed in the accompanying claims.

The invention claimed is:

1. A battery cell balancing circuit using LC serial resonance and performing battery cell balancing, comprising:
a battery module including a plurality of serially connected battery cells;
a first switch unit including a plurality of switches each connected between each terminal of the plurality of battery cells and a first common node in order to provide a path for collecting electric energy charged in one or more battery cells of the plurality of battery cells and storing the electric energy in a capacitor, or for supplying the electric energy collected and stored in the capacitor to the one or more battery cells;
a second switch unit including a plurality of switches each connected between each terminal of the plurality of battery cells and a second common node in order to provide the path for supplying the electric energy collected and stored in the capacitor to the one or more battery cells, or for collecting the electric energy charged in the one or more battery cells;

a serial resonant circuit connected between the first common node and the second common node and including an inductor and the capacitor, the indicator and the capacitor are serially connected and performing a serial resonant function; and a third switch unit including a plurality of switches connected between the first common node and both terminals of the serial resonant circuit and switches connected between the second common node and both terminals of the serial resonant circuit in order to provide the path for collecting the electric energy charged in the one or more battery cells of the plurality of battery cells, or for supplying the electric energy collected and stored in the capacitor to the one or more battery cells;

wherein the serial resonant circuit further including:

a first diode and a second diode connected in parallel to each other between both terminals of the serial resonant circuit and an upper terminal which is connected to a positive terminal of a battery cell of the plurality of serially connected battery cells; and a third diode and a fourth diode connected in parallel to each other between both terminals of the serial resonant circuit and a lower terminal which is connected to a negative terminal of another battery cell of the plurality of serially connected battery cells.

2. The battery cell balancing circuit using LC serial resonance according to claim 1, wherein each switch of the first to third switch units includes one or more of a Single Pole Single Throw (SPST) and a MOS transistor.

3. The battery cell balancing circuit using LC serial resonance according to claim 2, wherein the MOS transistor is decided as an N channel MOS transistor or a P channel MOS transistor according to a direction of a current flowing through the MOS transistor.

4. The battery cell balancing circuit using LC serial resonance according to claim 1, wherein the plurality of switches included in the first switch unit include switches each having one side terminal connected to each terminal of the plurality of battery cells and another side terminal commonly connected to the first common node.

5. The battery cell balancing circuit using LC serial resonance according to claim 1, wherein the plurality of switches included in the second switch unit include switches each having one side terminal connected to each terminal of the plurality of battery cells and another side terminal commonly connected to the second common node.

6. The battery cell balancing circuit using LC serial resonance according to claim 1, wherein the plurality of switches included in the third switch unit include switches connected in parallel to one another between the first common node and both terminals of the serial resonant circuit and switches connected in parallel to one another between the second common node and both terminals of the serial resonant circuit.

7. The battery cell balancing circuit using LC serial resonance according to claim 1, wherein capacity of each of the plurality of battery cells is larger than capacity of the capacitor of the serial resonant circuit by a predetermined value or more.

8. A battery cell balancing circuit using LC serial resonance comprising:

a battery module including a plurality of serially connected battery cells;

a first switch unit including a plurality of MOS transistors and reverse current blocking diodes connected between each terminal of the plurality of battery cells and a first common node in order to provide the path for collecting electric energy charged in one or more battery cells of the plurality of battery cells and storing the electric energy in a capacitor, or for supplying the electric energy collected and stored in the capacitor to the one or more battery cells, each MOS transistor and each diode being connected in parallel to each other;

a second switch unit including a plurality of MOS transistors and reverse current blocking diodes connected between each terminal of the plurality of battery cells and a second common node in order to provide a path for supplying the electric energy collected and stored in the capacitor to the one or more battery cells, or for collecting the electric energy charged in the one or more battery cells, each MOS transistor and each diode being connected in parallel to each other; a serial resonant circuit connected between the first common node and the second common node and including an inductor and the capacitor, the indicator and the capacitor are serially connected and performing a serial resonant function; and a third switch unit including MOS transistors and reverse current blocking diodes connected between the first common node and both terminals of the serial resonant circuit and MOS transistors and reverse current blocking diodes connected between the second common node and both terminals of the serial resonant circuit in order to provide the path for collecting the electric energy charged in the one or more battery cells of the plurality of battery cells, or for supplying the electric energy collected and stored in the capacitor to the one or more battery cells, each MOS transistor and each diode being connected in parallel to each other;

wherein the serial resonant circuit further including:

a first diode and a second diode connected in parallel to each other between both terminals of the serial resonant circuit and an upper terminal which is connected to a positive terminal of a battery cell of the plurality of serially connected battery cells; and a third diode and a fourth diode connected in parallel to each other between both terminals of the serial resonant circuit and a lower terminal which is connected to a negative terminal of another battery cell of the plurality of serially connected battery cells.

9. The battery cell balancing circuit using LC serial resonance according to claim 8, wherein each reverse current blocking diode is connected between one side terminal and another side terminal of each MOS transistor.

10. A battery cell balancing circuit using LC serial resonance and performing battery cell balancing, comprising:

a battery module including a plurality of serially connected battery cells;

a first switch unit including a plurality of switch paths connected between some of terminals of the plurality of battery cells and a first common node in order to provide a path for collecting electric energy charged in an arbitrary cell of the plurality of battery cells, or for supplying the electric energy collected and stored in a capacitor to the arbitrary cell battery cell, the plurality of switch paths each including two serially connected MOS transistors each connected in parallel to diodes;

a second switch unit including a plurality of switch paths connected between remaining terminals, other than some of terminals of the plurality of battery cells, and a second common node in order to provide the path for supplying the electric energy collected and stored in the capacitor to the arbitrary cell, or for collecting the electric energy charged in the arbitrary cell, the plurality of switch paths each including two serially connected MOS transistors each connected in parallel to diodes;

a serial resonant circuit connected between the first common node and the second common node and including an inductor and the capacitor, the indicator and the capacitor are serially connected and performing a serial resonant function; and a third switch unit including switch paths connected between the first common node and both terminals of the serial resonant circuit and switch paths connected between the second common node and both terminals of the serial resonant circuit in order to provide the path for collecting the electric energy charged in the arbitrary cell of the plurality of battery cells, or for supplying the electric energy collected and stored in the capacitor to the arbitrary cell, the plurality of switch paths each including two serially connected MOS transistors each connected in parallel to diodes;

wherein the serial resonant circuit further including:

a first diode and a second diode connected in parallel to each other between both terminals of the serial resonant circuit and an upper terminal which is connected to a positive terminal of a battery cell of the plurality of serially connected battery cells; and a third diode and a fourth diode connected in parallel to each other between both terminals of the serial resonant circuit and a lower terminal which is connected to a negative terminal of another battery cell of the plurality of serially connected battery cells.

11. The battery cell balancing circuit using LC serial resonance according to claim 10, wherein the plurality of switch paths of the first switch unit comprise:

a first switch path connected between one side terminal of a first battery cell and the first common node;

a third switch path connected between one side terminal of a third battery cell and the first common node; and a fifth switch path connected between another side terminal of a fourth battery cell and the first common node.

12. The battery cell balancing circuit using LC serial resonance according to claim 10, wherein the plurality of switch paths of the second switch unit comprise:

a second switch path connected between one side terminal of a second battery cell and the second common node;

a fourth switch path connected between one side terminal of a fourth battery cell and the second common node.

13. A battery cell balancing circuit using LC serial resonance and performing battery cell balancing, comprising:

a battery module including a plurality of serially connected battery cells;

a first switch unit including a plurality of switches each connected between each terminal of the plurality of battery cells and a first common node in order to provide a path for collecting electric energy charged in one or more battery cells of the plurality of battery cells and storing the electric energy in 1 capacitor, or for supplying the electric energy collected and stored in the capacitor to the one or more battery cells;

a second switch unit including a plurality of switches each connected between each terminal of the plurality of battery cells and a second common node in order to provide the path for supplying the electric energy collected and stored in the capacitor to the one or more battery cells, or for collecting the electric energy charged in the one or more battery cells; and a serial resonant circuit connected between the first common node and the second common node and including an inductor and the capacitor, the indicator and the capacitor are serially connected and performing a serial resonant function;

wherein the serial resonant circuit further including:

a first diode and a second diode connected in parallel to each other between both terminals of the serial resonant circuit and an upper terminal which is connected to a positive terminal of a battery cell of the plurality of serially connected battery cells; and a third diode and a fourth diode connected in parallel to each other between both terminals of the serial resonant circuit and a lower terminal which is connected to a negative terminal of another battery cell of the plurality of serially connected battery cells.

14. The battery cell balancing circuit using LC serial resonance according to claim 13, wherein the plurality of switch paths of the first switch unit each include two serially connected MOS transistors, and the two MOS transistors each are connected in parallel to diodes.

15. The battery cell balancing circuit using LC serial resonance according to claim 13, wherein the plurality of switch paths of the second switch unit each include two serially connected MOS transistors, and the two MOS transistors each are connected in parallel to diodes.

16. The battery cell balancing circuit using LC serial resonance according to claim 13, wherein a switch is connected in parallel to the capacitor of the serial resonant circuit in order to reset charge remaining in the capacitor after a resonance operation of the serial resonant circuit.

17. The battery cell balancing circuit using LC serial resonance according to claim 1, wherein third switch unit includes a first switch connected between the first common node and one terminal of the serial resonant circuit, a second switch connected between the second common node and another terminal of the serial resonant circuit, a third switch connected between the first common node and the another terminal of the serial resonant circuit, and a fourth switch connected between the second common node and the one terminal of the serial resonant circuit.

18. The battery cell balancing circuit using LC serial resonance according to claim 8, wherein the third switch unit includes a first MOS transistor and a first reverse current blocking diode connected between the first common node and one terminal of the serial resonant circuit, a second MOS transistor and a second reverse current blocking diode connected between the second common node and another terminal of the serial resonant circuit, a third MOS transistor and a third reverse current blocking diode connected between the first common node and the another terminal of the serial resonant circuit, and a fourth MOS transistor and a fourth reverse current blocking diode connected between the second common node and the one terminal of the serial resonant circuit.

19. The battery cell balancing circuit using LC serial resonance according to claim 10, wherein the third switch unit includes a first switch path connected between the first common node and one terminal of the serial resonant circuit, a second switch path connected between the second common node and another terminal of the serial resonant circuit, a third switch path connected between the first common node and the another terminal of the serial resonant circuit, and a fourth switch path connected between the second common node and the one terminal of the serial resonant circuit.

20. The battery cell balancing circuit using LC serial resonance according to claim 13, wherein the serial resonant circuit further including:
   a first diode and a second diode connected in parallel to each other between both terminals of the serial resonant circuit and an upper terminal which is connected to a positive terminal of a battery cell of the plurality of serially connected battery cells; and
   a third diode and a fourth diode connected in parallel to each other between both terminals of the serial resonant circuit and a lower terminal which is connected to a negative terminal of another battery cell of the plurality of serially connected battery cells.

* * * * *